Patented Nov. 13, 1934

1,980,536

UNITED STATES PATENT OFFICE 1,980,536

MANUFACTURE OF DI-(HYDROXYETHYL)-AMINONITROBENZENES

Hans Lange, Dessau in Anhalt, Germany, assignor to General Aniline Works, Inc., New York, N. Y., a corporation of Delaware No Drawing. Application December 22, 1933, Serial No. 703,676. In Germany December 24, 1932

7 Claims. (Cl. 260—128)

My present invention relates to a new process of manufacturing di(hydroxyethyl)-aminonitrobenzenes and its derivatives and to the new products obtainable by this process.

As known, ethylene oxide is easily taken up by aromatic amines under formation of mono- or bis-hydroxyethylated arylamines. Thus, for instance, aminobenzene or 1-methyl-3-aminobenzene form quantitatively the corresponding N-bis-hydroxyethyl compounds, already when treated at ordinary temperature with 2 molecular proportions of ethylene oxide in a closed vessel. The same products likewise are obtainable by double decomposition of the amines with ethylene chlorhydrine. However, by the presence of a nitro group in the molecule, the reactivity of the amino group is extraordinarily reduced, so that, for instance, the N-bis-hydroxyethyl compound is only obtained in a poor yield by double decomposition of 1-amino-3-nitrobenzene with ethylene chlorhydrine.

Now, I have found that nevertheless the nitroarylamines may be converted into the corresponding N-bis-hydroxyethyl compounds with excellent yields and without danger by treating the said starting materials under pressure with ethylene oxide at an elevated temperature. By reduction, arylene diamines are obtainable in which one amino group is disubstituted by hydroxyethyl groups. As well the nitro as the amino compounds are valuable intermediate products in the manufacture of azo dyes.

The following examples serve to illustrate my invention, the parts being by weight.

*Example 1.*—221 parts of 1-amino-3-nitrobenzene are heated together with 155 parts of ethylene oxide for 6 hours at about 150 to 160° C. in a pressure vessel. After cooling, the reaction product solidifies completely under formation of crystals of 1-di-(hydroxyethyl)-amino-3-nitrobenzene. This product may be recrystallized from water, diluted alcohol or benzene. It forms yellow needles melting at 98 to 99° C.

*Example 2.*—In the same manner 221 parts of 1-amino-4-nitrobenzene are treated with 155 parts of ethylene oxide. The 1-di(hydroxyethyl)-amino-4-nitrobenzene is obtained in a pure state by subsequent recrystallization from water and chloroform; it melts at 101 to 102° C.

*Example 3.*—212.8 parts of 1-methyl-2-amino-4-nitrobenzene are heated in a pressure vessel for 6 hours together with 135.5 parts of ethylene oxide at about 150 to 160° C. 1-methyl-2-di-(hydroxyethyl)-amino-4-nitrobenzene is obtained in a yield of about 75 per cent. It may be recrystallized from benzene or acetone. It melts at 113 to 114° C.

*Example 4.*—135 parts of 1-methoxy-2-amino-4-nitrobenzene are heated with 78 parts of ethylene oxide for 6 hours at 150 to 160° C. The reaction product solidifies after cooling under formation of dark red rosettic crystals which, recrystallized from alcohol or benzene, melt at 100 to 101° C.

The nitro compounds thus obtained may be easily reduced under the usual conditions under formation of the corresponding amino compounds.

It is obvious that my invention is not limited to the foregoing examples or to the specific details given therein. Instead of the nitro compounds mentioned in the examples, other derivatives containing other substituents, such as halogen or a plurality of such substituents may be used as starting materials. The temperature at which the condensation with ethylene oxide is carried out, may be varied between about 130 to about 200° C. according to the activity of the nitroamine under reaction.

What I claim is:—

1. The N-bis-hydroxyethylaminonitroaryls of the benzene series forming in the purified state yellow to red crystals, being difficultly soluble in the cold in aliphatic and aromatic hydrocarbons and water, forming salts with inorganic acids and being not distillable at ordinary pressure.

2. The compounds corresponding to the general formula

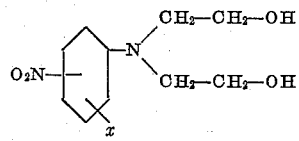

in which $x$ means hydrogen, alkyl, alkoxy or halogen, forming in the purified state yellow to red crystals, being difficultly soluble in the cold in aliphatic and aromatic hydrocarbons and water, forming salts with inorganic acids and being not distillable at ordinary pressure.

3. The compounds corresponding to the general formula

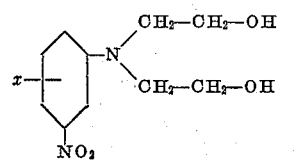

in which $x$ means hydrogen, alkyl, alkoxy or halogen, forming in the purified state yellow to red crystals, being difficultly soluble in the cold in aliphatic and aromatic hydrocarbons and water, forming salts with inorganic acids and being not distillable at ordinary pressure.

4. The compounds corresponding to the general formula

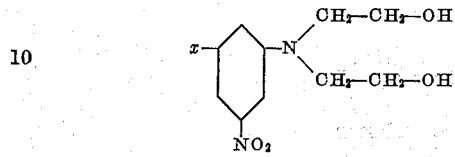

in which $x$ means hydrogen, alkyl, alkoxy or halogen, forming in the purified state yellow to red crystals, being difficultly soluble in the cold in aliphatic and aromatic hydrocarbons and water, forming salts with inorganic acids and being not distillable at ordinary pressure.

5. 1-di(hydroxyethyl)-amino - 3 - nitrobenzene forming in the pure state yellow needles melting at 98 to 99° C., being difficultly soluble in the cold in aliphatic and aromatic hydrocarbons, in diluted alcohol and water, forming salts with inorganic acids and being not distillable at ordinary pressure.

6. 1 - methyl - 2 - di(hydroxyethyl) - amino - 4-nitrobenzene forming in the pure state yellow crystals melting at 113 to 114° C., being difficultly soluble in the cold in aliphatic and aromatic hydrocarbons, in diluted alcohol and water, forming salts with inorganic acids and being not distillable at ordinary pressure.

7. 1 - methoxy - 2 - (dihydroxyethyl) - amino-4-nitrobenzene forming in the pure state red rosettic crystals melting at 100 to 101° C., being difficultly soluble in the cold in aliphatic and aromatic hydrocarbons, in diluted alcohol and water, forming salts with inorganic acids and being not distillable at ordinary pressure.

HANS LANGE.